No. 856,029. PATENTED JUNE 4, 1907.
R. G. CAMPBELL.
APPARATUS FOR TREATING TEXTILE FIBERS.
APPLICATION FILED FEB. 16, 1906.
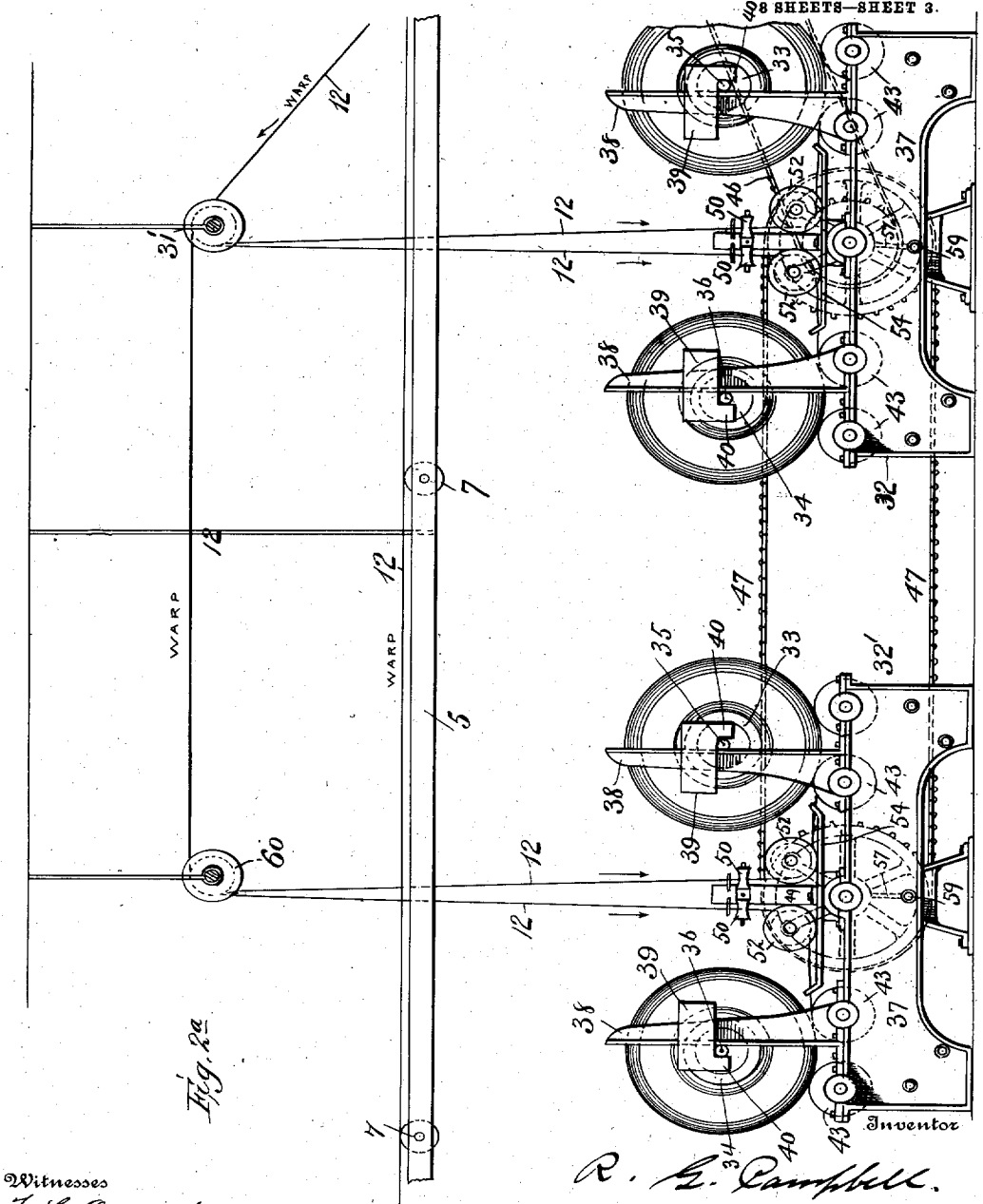

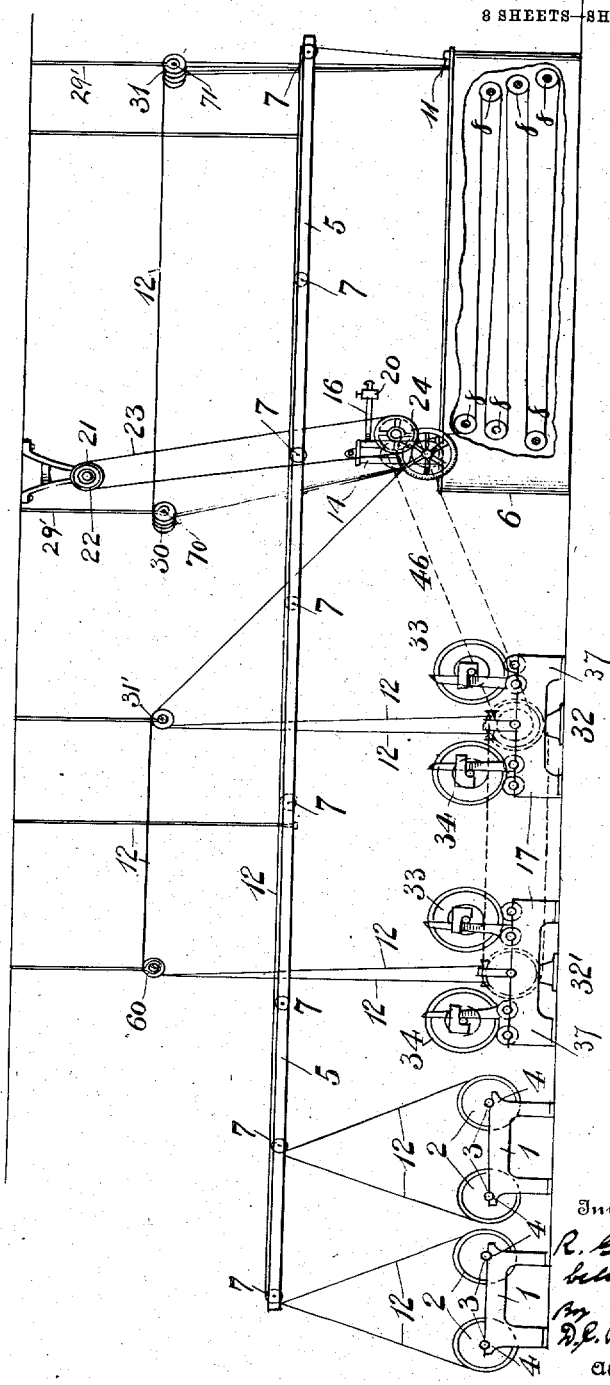

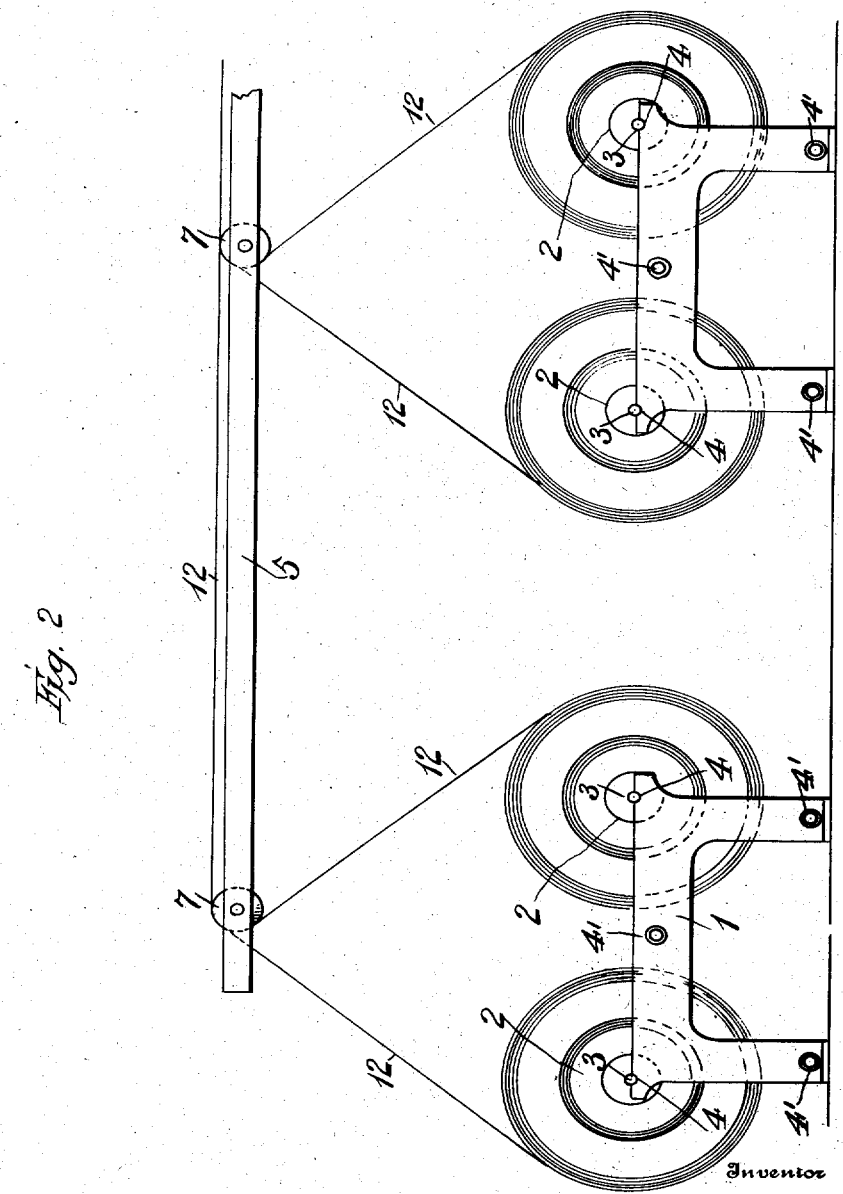

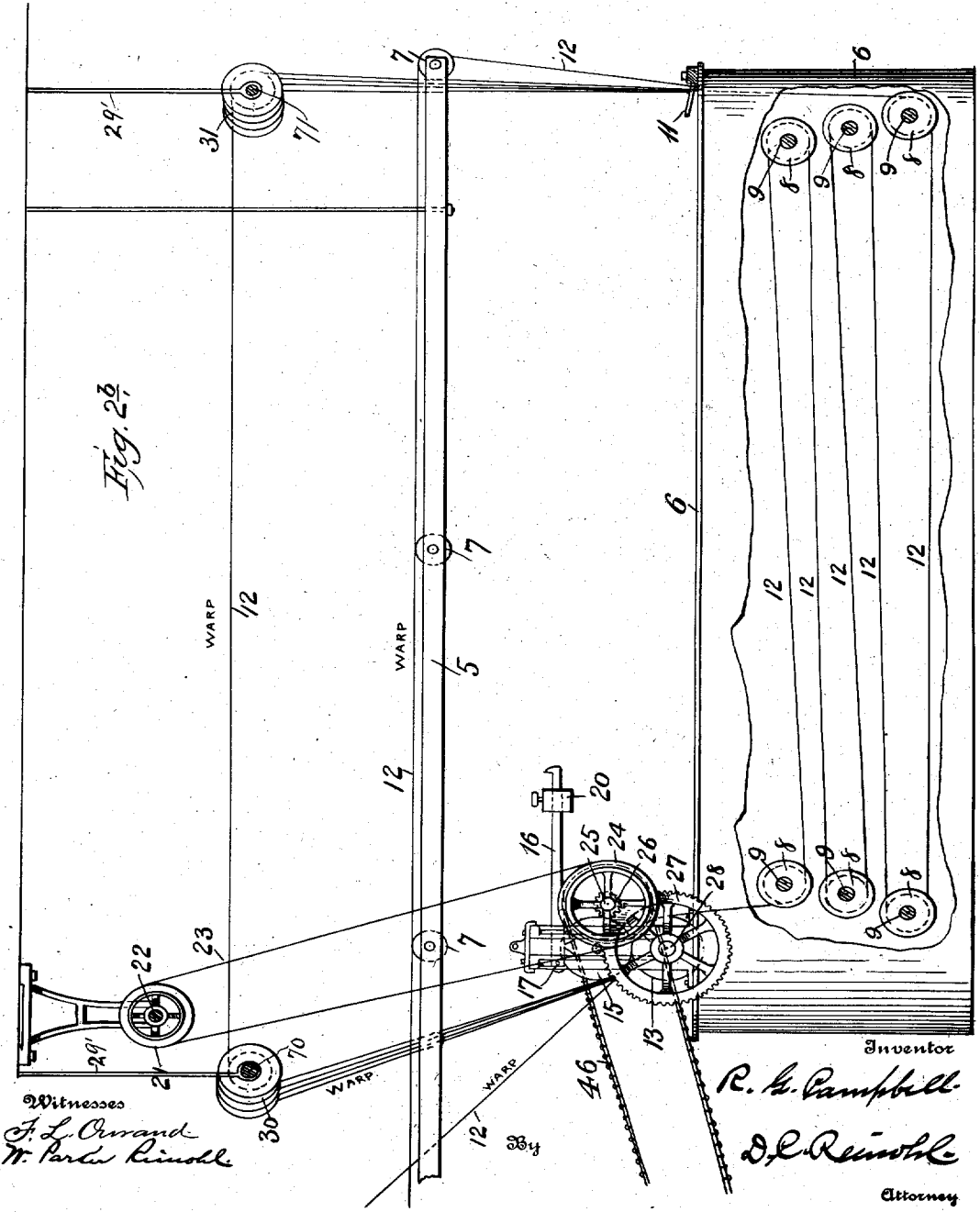

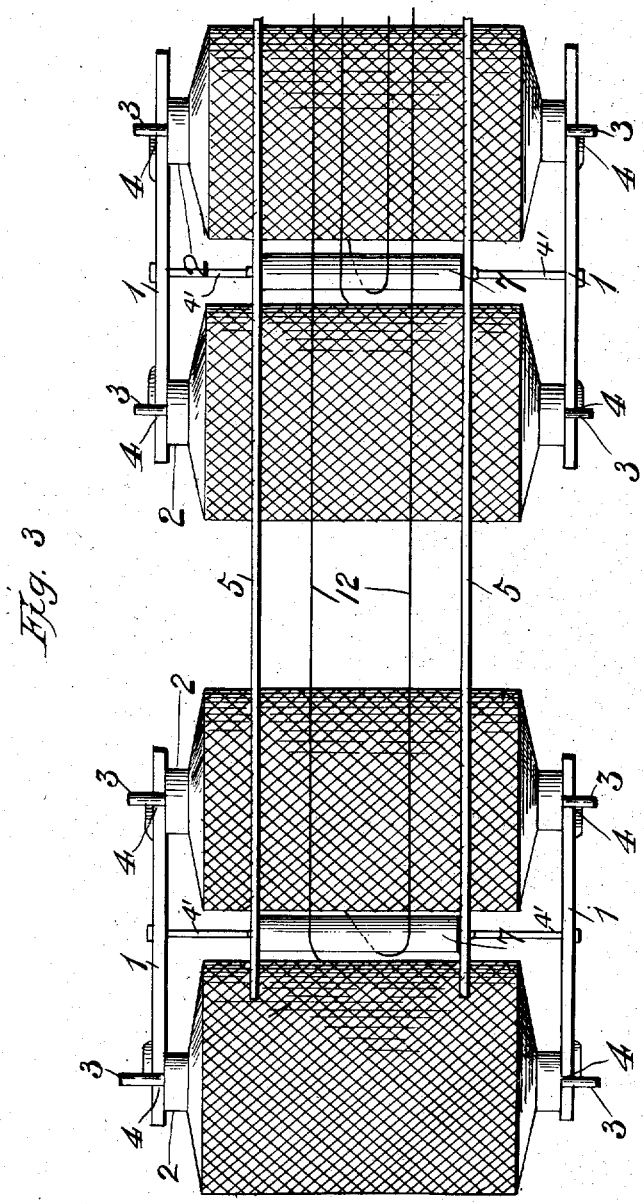

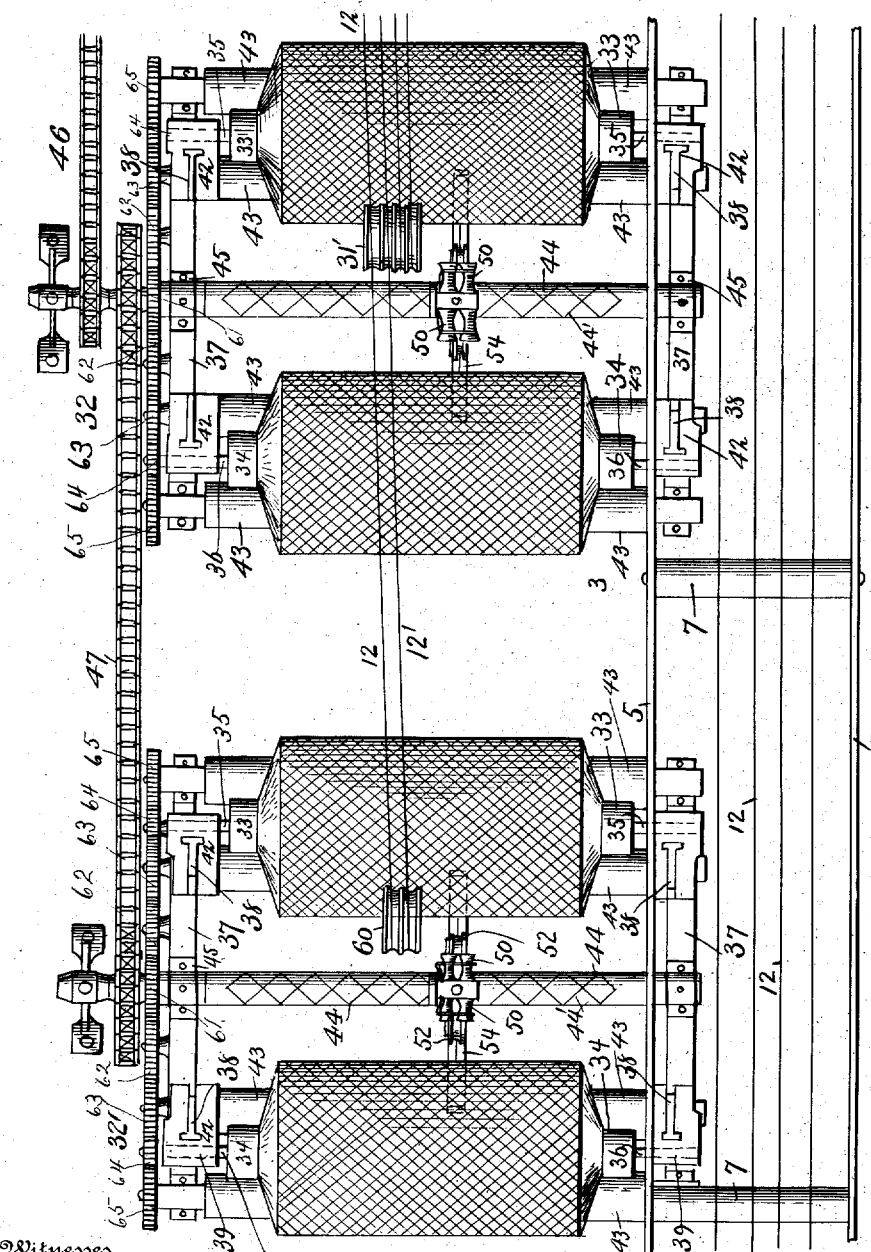

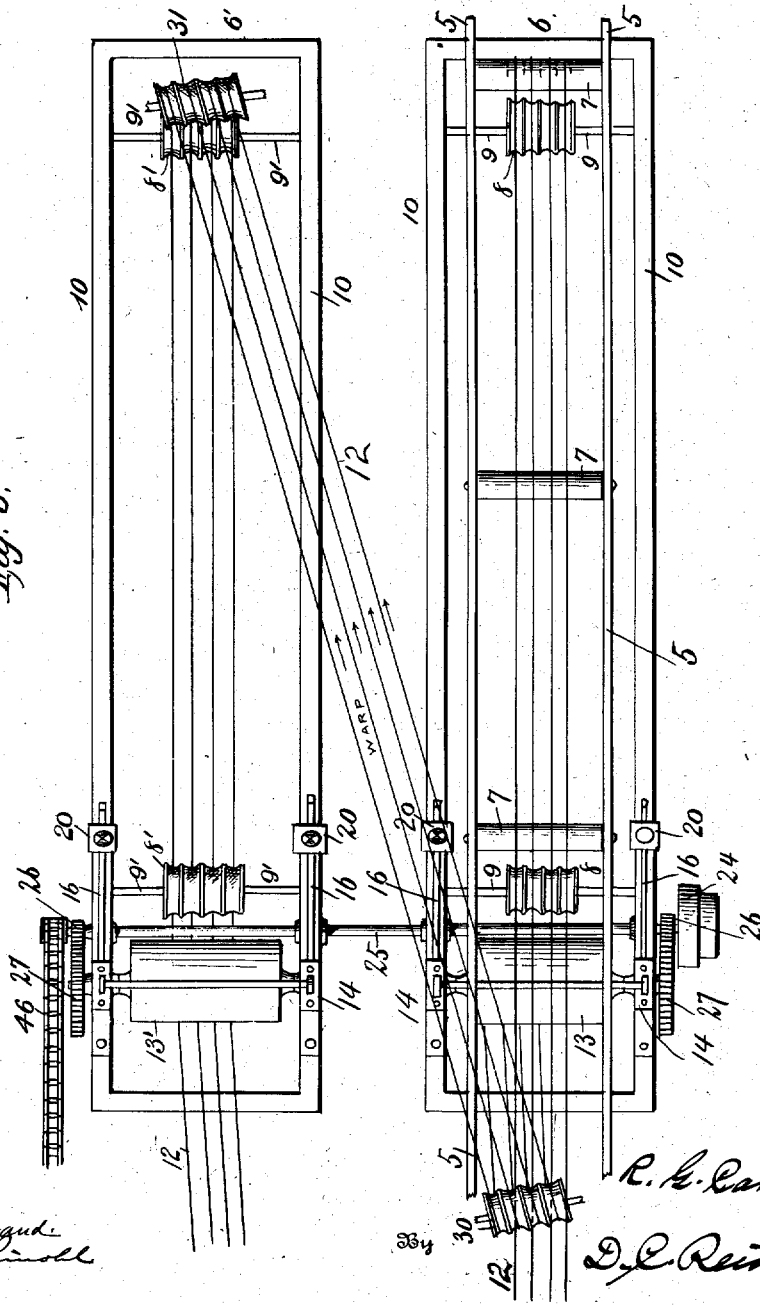

No. 856,029. PATENTED JUNE 4, 1907.
R. G. CAMPBELL.
APPARATUS FOR TREATING TEXTILE FIBERS.
APPLICATION FILED FEB. 16, 1906.
8 SHEETS—SHEET 8.
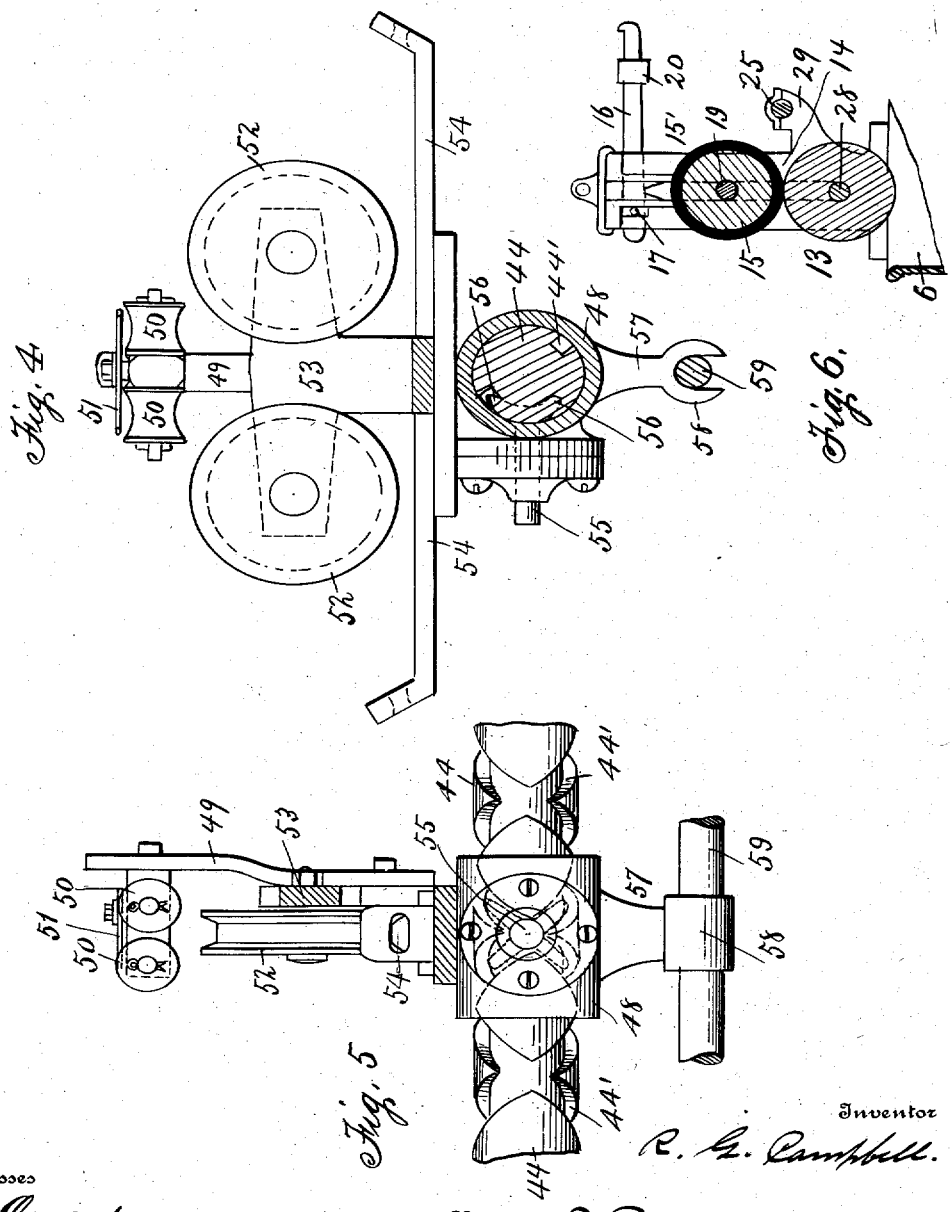

UNITED STATES PATENT OFFICE.

ROBERT G. CAMPBELL, OF GREENSBORO, NORTH CAROLINA.

APPARATUS FOR TREATING TEXTILE FIBERS.

No. 856,029. Specification of Letters Patent. Patented June 4, 1907.

Application filed February 16, 1906. Serial No. 301,484.

*To all whom it may concern:*

Be it known that I, ROBERT G. CAMPBELL, a citizen of the United States, residing at Greensboro, in the county of Guilford and State of North Carolina, have invented certain new and useful Improvements in Apparatus for Treating Textile Fibers; and I do hereby declare the following to be a full, clear, and exact description of the invention, such as will enable others skilled in the art to which it appertains to make and use the same.

My invention relates to the treatment of textile fibers, such as yarns and warp, has especial reference to dyeing such fibers, has for its object economy in time, labor, and dyeing material, by subjecting the fibers in the form of warp, from beams to the dyeing material while in transit through the vat, and again winding the warp upon other beams as it proceeds from the vat, in contradistinction to subjecting the material in bulk to the dye liquor or drawing the warp from cans, dyeing the warp and then discharging the warp from the vat into cans or boxes.

The invention consists in certain improvements which will be fully disclosed in the following specification and claims.

In the prevailing practice of dyeing textile fibers in bulk, it is practically impossible to produce uniform shades of color of the material, for the reason, that all the material is not exposed alike to the dye liquor; the material in the center of the bulk being less exposed to the liquor than the outer portions. Furthermore, considerable waste in material occurs, by breaking and tangling of the fiber, yarn or warp, in winding or balling them upon beams.

Warp usually contains from four hundred and fifty to five hundred threads or ends and is from four thousand to four thousand five hundred yards long, and the prevailing practice of dyeing warp other than in bulk, consists in drawing the warp out of the boiling vat and depositing it in cans or boxes, in which the warp is distributed evenly and pressed down by hand, and, as many cans are used as are necessary to contain the warp of a set. The cans are placed upon a truck in sets of four and conveyed to the dyeing vats and placed in position for the warp to be conducted through the dye liquor by the use of friction or pressing rollers, which draw the warp through the liquor of the first vat and deposit the warp in other like cans. The warp in coming from the cans frequently becomes tangled and requires the attention of a workman for each set of four cans from which boiled warp is being drawn to untangle the warp to prevent breaking and kinking of the threads, or choking the feed rolls.

The warp passing through the several vats, from six to eight in number, to get the color required is deposited in other cans than those from which it is being drawn to the dye vat, so that in dyeing a set of warp, as many as forty cans are required, entailing much labor and consuming much time, beside the loss due to breaking the threads or ends, which must be tied before it can proceed to the warp beam for the loom. The warp after coming out of one vat and deposited in cans must be moved to another vat by manual labor, thus requiring from six to eight handlings, and the time consumed in dyeing a set of warps is two days and a half, while by the present invention, no handling of the warp is required, and the dyeing is completed in one day. The warp is kept under the same tension from the time it is unwound from the beams on which it is supported until it is wound again upon other beams after it has been dyed.

It is my purpose to treat the fibers, in separate strands of warp preferably four to a set, for boiling, bleaching, dyeing, washing or mercerizing while in motion, and being unwound from one beam, reel or spool, conducted through the liquor for either, or all the purposes, and again wound upon other beams, reels or spools as it proceeds from the vat or vats.

In the accompanying drawings, which form part of this specification:—Figure 1 represents a side elevation of my improved apparatus, the side of the vat being partly broken away. Figs. 2, 2ª, and 2ᵇ are like views of the same on an enlarged scale. Figs. 3, 3ª and 3ᵇ are plan views of the same. Fig. 4 a side elevation partly in section of the traverse or carriage for guiding the warp to the beams for winding or balling after it has been treated in the vat, on an enlarged scale. Fig. 5 an end elevation partly in section, of the same, and Fig. 6 an enlarged vertical transverse section of the warp feed and pressing rolls.

Reference being had to the drawings and the designating characters thereon, the numeral 1 indicates the frames on which the warp beams 2 are supported by their axle-journals 3 resting in suitable bearings 4 in the upper edge of the frames. The frames are secured together by transverse rods or bolts 4'. 5 indicates an elevated frame, preferably suspended from the ceiling of a room in any preferred manner, such as suitable hangers and stay or brace rods, not shown, and the frame extends from the first beam to, or nearly to the rear or outer end of the vat 6, and is provided with transverse rollers 7, for supporting the warp while in transit from the beams to the vat.

The vat 6 is provided at each end with separate revoluble guide sheaves 8 for each warp, preferably placed in different horizontal and different vertical planes to prevent interference of the warp, their shafts 9 being supported in suitable bearings, not shown, secured to the inner side of the sides 10 of the vat.

6' is a supplemental vat on one side of vat 6, and of which there may be any preferred number found necessary or advantageous in the use to which the apparatus is applied. The supplemental vat is also provided with separate revoluble guide sheaves 8' having shafts 9'.

11 indicates guide fingers which are secured on the top of the outer end of the vat and extend inward to guide the warp 12 to the lower sheaves 8 or 8' at the outer end of the vat, from which sheaves the warp travels horizontally, then upward over the successive sheaves to the under side of the upper sheaves at the inner end of the vat.

13 and 13' indicate a pair of rolls mounted in suitable pedestals 14, 14 resting on the top edge of each side of the vats 6, and 6', and near the inner end thereof. The rolls may be made of hard wood or of metal, and the upper roll 15 is preferably covered with rubber, cloth or other suitable material 15', and the pressure upon the top rolls, operates to squeeze or press the dye liquor out of the warp and draw the warp from the beams 2, through the vat. The pressure is regulated by levers 16, fulcrumed at 17, engaging a block 18, resting upon the shaft 19 of the top roll, and provided with a weight 20, adjustable on the lever to regulate the degree or amount of pressure on the warp.

The rolls 13 and 13' are driven by power transmitted from a suitable source, through pulley 21 on shaft 22, belt 23, and pulley 24 on shaft 25, on which is secured a pinion 26, which engages a gear-wheel 27 on the shaft 28 of the lower roll. The shaft 25 is supported on brackets 29 on the pedestals 14, as shown in Figs. 3$^b$ and 6, and extends across the vats 6 and 6' to drive the two sets of rolls synchronously, whereby the work of drawing the warp is effected by the joint operation of the two sets of rolls and the warp is kept under the same tension in both vats.

30 indicates a plurality of guide sheaves, one for each warp separately revoluble on shaft 70, supported from the ceiling in any preferred manner, such as by hangers 29' above the frame 5 and beyond the inner end of the vat 6, over which the strands of warp are conducted from the rolls 13. 31 is another like set of sheaves revoluble on shaft 71 supported by like hangers 29' above the outer end of vat 6', as shown in Figs. 2$^b$ and 3$^b$, over which the warp travels on its way to vat 6', then travels over the several sheaves 8' in said vat successively, in like manner in which it traveled over the sheaves 8 in vat 6, emerges therefrom and passes through the rolls 13' on the vat 6', by which the warp is drawn and travels to the guide sheaves 31 above the warp winding machine 32, where the strands of warp are separated and two of the strands are wound respectively upon beams 33 and 34, supported upon axles 35 and 36.

The distance between the inner end of the vat 6 and the outer end of the vat 6', and the time required for the warp to travel from vat 6 over sheaves 30 and 31 to vat 6' is sufficient for the dye in the warp to oxidize by exposure to the atmosphere; and each warp being supported on and traveling over separate sheaves prevents tangling of the warp due to breaking of a thread or threads in the warp as frequently occurs in the use of a continuous cylindrical roll.

The warp winding machines being duplicates, well known, and their general construction forming no part of my present invention, a general description thereof will suffice.

37 indicates the sides or frames of the machines, on which are vertical standards or supports 38, which are provided with loosely mounted vertically movable clamps 39, having an extension 40 at one end which engages the axle of the beam and secures it against lateral movement outward from the standards; the clamps 39 are provided with a T-shaped slot 42 which engages the standard 38, which in transverse section is also T-shaped, as shown in Fig. 3$^a$.

43, 43 are friction rolls to support and revolve the beams 33, 34, and as the warp is wound upon the beams, the beams, their axles and the clamps 39 rise on the standards 38.

The rolls 43, 43 are of a diameter to revolve the beams 33 and 34 respectively at such a rate of speed as to draw the warp from the rolls 13' and maintain the tension of the warp from the time it leaves the beams 2 from which it is unwound, until it is again rewound on the beams 33 and 34. The effect of this tension on the warp is to keep it free from kinks and tangles, in which condition it travels through the vats and is readily and thoroughly impregnated with the dye liquor, resulting in economy of dyeing material and time, and avoiding frequent repetitions of passing the warp through the liquor.

The practical operation of the invention has demonstrated a saving of at least fifteen per cent. of dye material and fifty per cent. in labor, compared with the prevailing practice of dyeing warp, while the color of the dyed warp is absolutely uniform throughout the length of the warp, and consequently the fabric made from the warp is of uniform color throughout its length and width.

The warp winding machines are each provided with a shaft 44 having opposite spiral grooves 44', and are supported in bearings 45 on the frames 37 and are revolved by means of a sprocket chain 46 driven from the shaft 25, and a like chain 47 between the winding machine next to the vat and the outer one. On the shaft 44 of each winding machine is a gear wheel 61, which through gear-wheels 62, 63, 64 and 65 on both sides thereof transmits motion to the rollers 43, 43, to propel or revolve the beams 33, 34, by frictional contact with the warp being wound on the beams. On the shaft 44 is also a traverse or carriage 48, see Figs. 4 and 5, having a vertical arm 49, on opposite sides of which are guide rolls 50, between which the warp travels, and a loop 51, prevents the warp jumping off the rolls. 52 are guide sheaves supported on arm 53, and arranged at a right angle to the rolls 50, and direct the warp to guide fingers 54. The carrier 48 is connected to the spirally grooved shaft 44, by a spanner 55, provided with oppositely extending ends 56, which engage the grooves, and the carrier is prevented turning on the shaft by an arm 57 having a fork 58 engaging a transverse rod 59 between the frames 37.

Two strands of warp are wound or balled on the first winding machine 32, and the remaining two strands are conducted from the elevated sheaves 31' to like sheaves 60 over which they pass to the second winding machine 32', in which all the parts bear the same designating characters as in the first machine.

The warp beams 2 and their supporting frames are in alinement with the vat 6 and the winding machines 32 and 32' are in alinement with the vat 6'.

It is obvious that if a deeper shade of color is required than is produced by exposure of the warp to the dye liquor in the two vats 6 6', the warp may be conducted through other like vats until the desired color is obtained.

The warp in traveling from one vat to the other and from the second vat to the winding machines, is exposed to the atmosphere, by which the dye is oxidized or set in the warp after leaving each vat, thereby effecting great saving in the quantity of chemicals used in the dye liquor; and by unwinding the warp from one beam or from beams, dyeing the warp in transit, and then winding the warp upon other beams, the cost of handling the warp is also greatly reduced, and tangling, kinking and breaking of the warp prevented.

The dyed warp is washed and is then removed to a suitable drying apparatus where the warp is thoroughly dried.

It is my purpose to treat warp continuously, by first conducting it through vats and boiling the warp, then dyeing the warp, then washing the warp, and then winding the warp on suitable beams. When it is desired to bleach the warp, it is first conducted through a boiling vat, then through a bleaching vat, then through a washing vat, successively and continuously, and then winding the warp.

Having thus fully described my invention, what I claim is

1. Apparatus for treating warp, comprising warp beams, and two vats side by side carrying drawing rolls whose operating shaft extends over both vats, separate sheaves mounted in series on shafts within the vats whereby the strands of warp move independently through the vats, both vats being similar in construction and the entrance series of sheaves in one vat and the final series of the second vat so arranged that the warp travels continuously from its entrance into the first vat to its exit from the second vat.

2. Apparatus for treating warp, comprising a primary and a supplemental vat arranged side by side, drawing rolls at the same end of each vat, a shaft for operating said rolls and extending over both vats, elevated and separate sheaves arranged in series on a shaft above one end of the primary vat, live sheaves above the opposite end of the supplemental vat for conducting the warp from one end of the first vat to the opposite end of the second vat and exposing the warp to the atmosphere to oxidize the dye in the warp while in transit from one vat to the other, means for keeping separate the set of strands of warp, and means connected to the shaft for operating the drawing rolls for rewinding or balling the strands of warp separately.

3. Apparatus for treating warp, comprising a primary and a supplemental vat arranged side by side, separate sheaves mounted in series on shafts within the vats, warp drawing rolls at the same end of each vat, a shaft for operating said rolls and extending over both vats, elevated separate sheaves mounted in series on shafts above one end of the primary vat, like sheaves above the opposite end of the supplemental vat for conducting the warp in separate strands from one end of the former vat to the opposite end of the latter vat and exposing the warp to the atmosphere to oxidize the dye therein while in transit, like elevated sheaves for supporting and keeping separate the set of strands of warp and again exposing the warp to the atmosphere for further oxidation of the dye in the warp, and means operated from the shaft driving the drawing rolls for winding or balling the strands of warp separately and maintaining uniform tension on the warp until wound.

4. Apparatus for treating warp, comprising a primary vat, revoluble warp beams supported in frames in line with said vat, a plurality of separate revoluble sheaves mounted on shafts within and at each end of the vat and forming separated bearing surfaces for the several strands of warp, rolls at the inner end of the vat for drawing the warp from the beams and through the vat and expelling liquor therefrom, a supplemental vat by the side of the primary vat, provided with like revoluble sheaves within the vat, elevated sheaves forming separated bearing surfaces for the several strands of the warp above the inner end of the vat, like elevated sheaves above the rear end of the supplemental vat for conducting the warp from one vat to the other and exposing the warp to the atmosphere to oxidize the dye therein while in transit, rolls at the inner end of the supplemental vat for drawing the warp, a shaft extending across both the vats, connections therewith for operating the rolls of both vats, elevated sheaves for supporting and exposing the warp in separate strands to the atmosphere for further oxidation of the dye in the warp, and means operated by the driving shaft of the drawing rolls for winding the set of warp in separate strands and maintaining uniform tension on the warp until wound.

In testimony whereof I affix my signature, in presence of two witnesses.

ROBERT G. CAMPBELL.

Witnesses:
W. J. FLUHARTY,
BERNARD M. CONE.

---

Correction in Letters Patent No. 856,029.

It is hereby certified that in Letters Patent No. 856,029, granted June 4, 1907, upon the application of Robert G. Campbell, of Greensboro, North Carolina, for an improvement in "Apparatus for Treating Texile Fibers," an error appears in the printed specification requiring correction, as follows: In line 105, page 3, the word "live" should read *like;* and that the said Letters Patent should be read with this correction therein that the same may conform to the record of the case in the Patent Office.

Signed and sealed this 18th day of June, A. D., 1907.

[SEAL.]

C. C. BILLINGS,
*Acting Commissioner of Patents.* and keeping separate the set of strands of warp and again exposing the warp to the atmosphere for further oxidation of the dye in the warp, and means operated from the shaft driving the drawing rolls for winding or balling the strands of warp separately and maintaining uniform tension on the warp until wound.

4. Apparatus for treating warp, comprising a primary vat, revoluble warp beams supported in frames in line with said vat, a plurality of separate revoluble sheaves mounted on shafts within and at each end of the vat and forming separated bearing surfaces for the several strands of warp, rolls at the inner end of the vat for drawing the warp from the beams and through the vat and expelling liquor therefrom, a supplemental vat by the side of the primary vat, provided with like revoluble sheaves within the vat, elevated sheaves forming separated bearing surfaces for the several strands of the warp above the inner end of the vat, like elevated sheaves above the rear end of the supplemental vat for conducting the warp from one vat to the other and exposing the warp to the atmosphere to oxidize the dye therein while in transit, rolls at the inner end of the supplemental vat for drawing the warp, a shaft extending across both the vats, connections therewith for operating the rolls of both vats, elevated sheaves for supporting and exposing the warp in separate strands to the atmosphere for further oxidation of the dye in the warp, and means operated by the driving shaft of the drawing rolls for winding the set of warp in separate strands and maintaining uniform tension on the warp until wound.

In testimony whereof I affix my signature, in presence of two witnesses.

ROBERT G. CAMPBELL.

Witnesses:
W. J. FLUHARTY,
BERNARD M. CONE.

---

Correction in Letters Patent No. 856,029.

It is hereby certified that in Letters Patent No. 856,029, granted June 4, 1907, upon the application of Robert G. Campbell, of Greensboro, North Carolina, for an improvement in "Apparatus for Treating Texile Fibers," an error appears in the printed specification requiring correction, as follows: In line 105, page 3, the word "live" should read *like;* and that the said Letters Patent should be read with this correction therein that the same may conform to the record of the case in the Patent Office.

Signed and sealed this 18th day of June, A. D., 1907.

[SEAL.]

C. C. BILLINGS,
*Acting Commissioner of Patents.*

Correction in Letters Patent No. 856,029.

It is hereby certified that in Letters Patent No. 856,029, granted June 4, 1907, upon the application of Robert G. Campbell, of Greensboro, North Carolina, for an improvement in "Apparatus for Treating Texile Fibers," an error appears in the printed specification requiring correction, as follows: In line 105, page 3, the word "live" should read *like;* and that the said Letters Patent should be read with this correction therein that the same may conform to the record of the case in the Patent Office.

Signed and sealed this 18th day of June, A. D., 1907.

[SEAL.]

C. C. BILLINGS,
*Acting Commissioner of Patents.*